United States Patent [19]

Putman

[11] Patent Number: 5,468,189
[45] Date of Patent: Nov. 21, 1995

[54] TORSION DAMPER, IN PARTICULAR FOR A MOTOR VEHICLE

[75] Inventor: Carl Putman, Saleux, France

[73] Assignee: Valeo, Paris, France

[21] Appl. No.: 8,800

[22] Filed: Jan. 28, 1993

[30] Foreign Application Priority Data

Jan. 28, 1992 [FR] France .................................. 92 00876

[51] Int. Cl.⁶ ...................................................... F16D 3/14
[52] U.S. Cl. .............................................................. 464/68
[58] Field of Search .............................. 464/66, 64, 68; 192/106.2

[56] References Cited

U.S. PATENT DOCUMENTS

| | | | |
|---|---|---|---|
| 2,314,948 | 3/1943 | Nutt | 192/106.2 |
| 3,695,405 | 10/1972 | Maucher et al. . | |
| 4,121,706 | 10/1978 | Zapf | 192/106.2 |
| 4,274,525 | 6/1981 | Rabb et al. | 464/68 X |
| 4,570,775 | 2/1986 | Caray et al. | 464/64 X |
| 4,743,217 | 5/1988 | Tojima et al. | 464/64 X |
| 4,848,551 | 7/1989 | Casper | 464/68 X |
| 4,928,805 | 5/1990 | Takeuchi et al. | 464/68 |
| 5,059,155 | 10/1991 | Tojima | 464/68 |

FOREIGN PATENT DOCUMENTS

| | | |
|---|---|---|
| 2218504 | 9/1974 | France . |
| 2256686 | 7/1975 | France . |
| 2381944 | 9/1978 | France . |
| 2514446 | 4/1983 | France . |
| 2570147 | 3/1986 | France . |
| 2624419 | 6/1989 | France . |
| 1920242 | 11/1970 | Germany . |
| 3624496 | 1/1988 | Germany . |
| 3830579 | 3/1989 | Germany . |
| 3817954 | 11/1989 | Germany . |
| 1235826 | 6/1971 | United Kingdom . |
| 2217798 | 11/1989 | United Kingdom . |

*Primary Examiner*—Daniel P. Stodola
*Assistant Examiner*—Eileen A. Dunn
*Attorney, Agent, or Firm*—Longacre & White

[57] ABSTRACT

A torsion damper, especially for a clutch friction wheel in a heavy duty vehicle, comprises two coaxial parts which are mounted for relative rotation with respect to each other. One of these parts comprises a hub plate, formed with slots in which resilient members are mounted, while the other rotatable part comprises two guide rings arranged on either side of the hub plate. Each guide ring is formed with housings in which the resilient members are also mounted. The slots in the hub plate are formed by cutting with the aid of a laser beam.

6 Claims, 3 Drawing Sheets

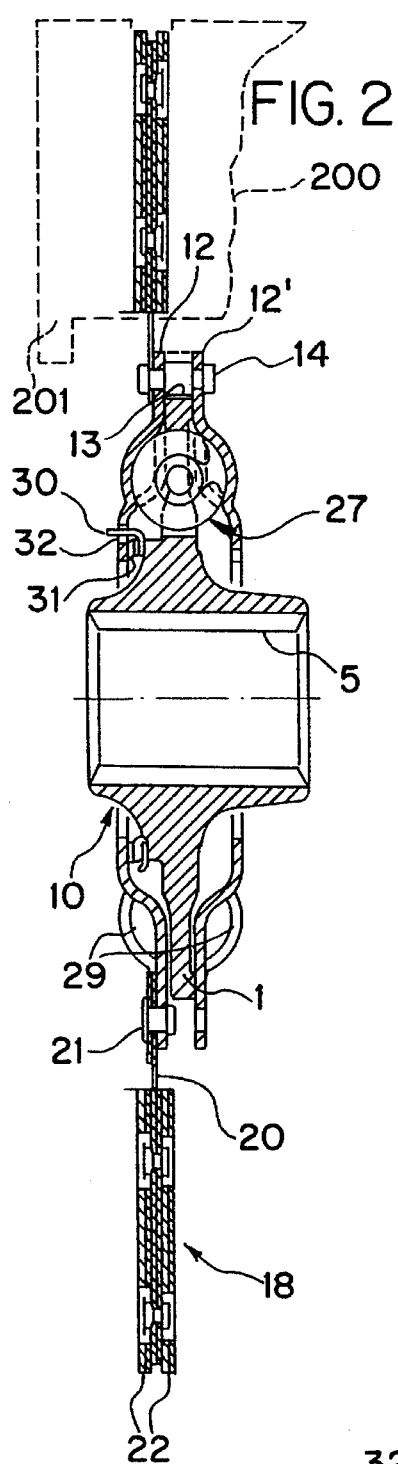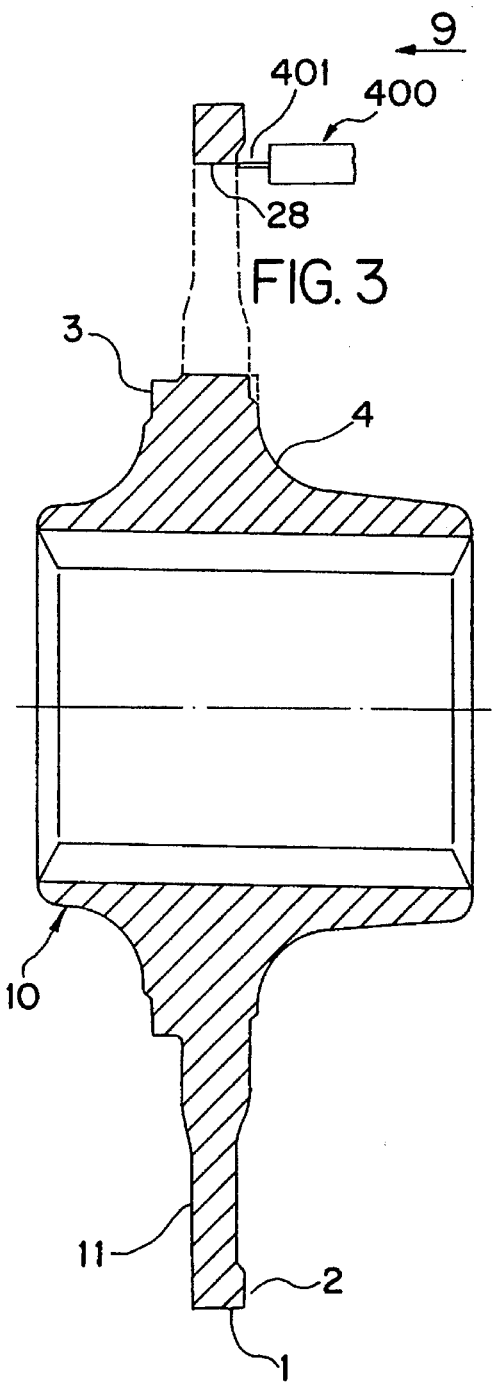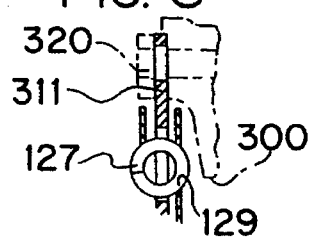

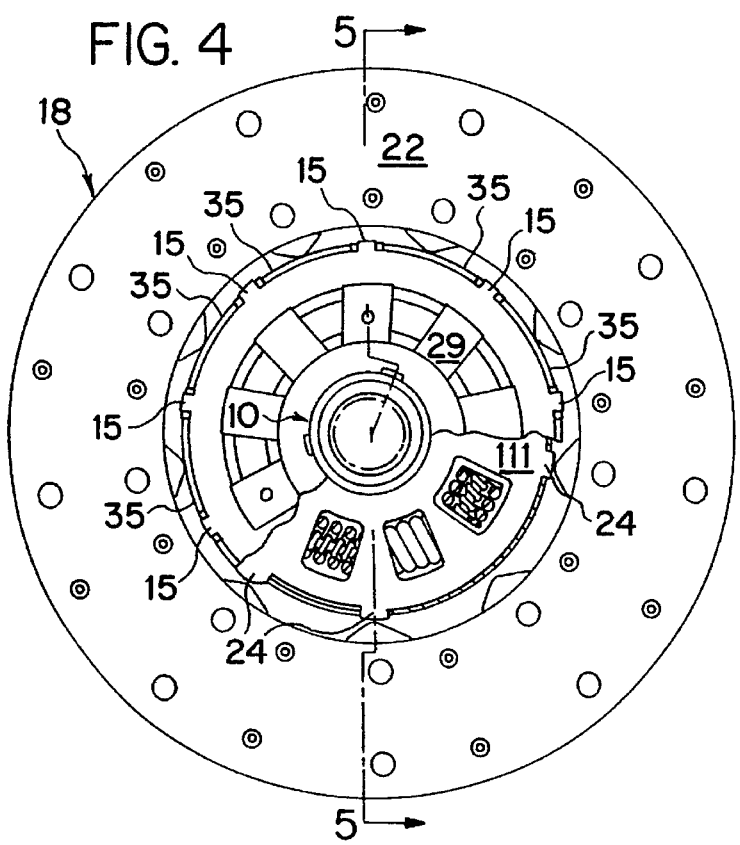
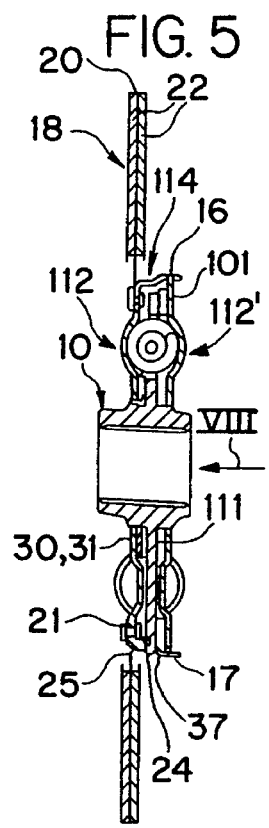
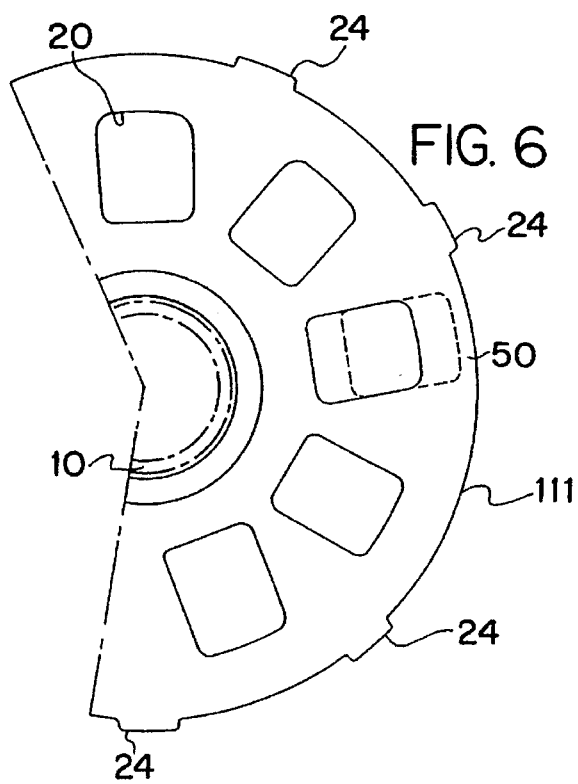
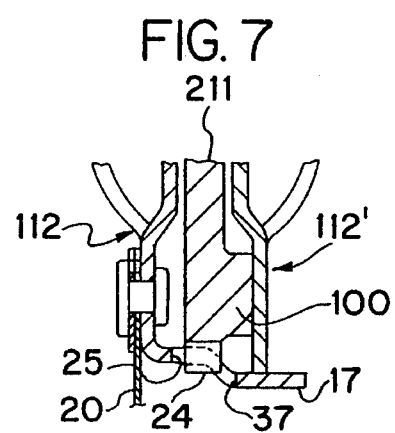

5,468,189

TORSION DAMPER, IN PARTICULAR FOR A MOTOR VEHICLE

FIELD OF THE INVENTION

The present invention relates to a torsion damper, in particular a clutch friction wheel for a motor vehicle, of the kind comprising two coaxial parts mounted for relative rotation of one with respect to the other within the limits of a predetermined angular displacement and against the action of circumferentially acting resilient members and friction means, in which one of the said coaxial parts comprises a hub plate formed with slots for mounting of the said resilient members therein, while the other one of the said coaxial parts comprises two guide rings arranged on either side of the said hub plate, with each of the said guide rings having housings facing towards the said slots for mounting of the said resilient members therein.

BACKGROUND OF THE INVENTION

One torsion damper of the above kind is described in United Kingdom patent specification No. 1 235 826, in which the hub plate is either mounted on the hub for rotation with the latter as in FIG. 1, or else it is mounted on the hub for relative rotation with respect to the hub as in FIG. 7. It has a greater thickness than the guide rings, and its slots are in the form of windows.

In each case, the windows in the hub plate are cut out by a punching operation using a punch and die, which is usually followed by additional treatment such as cementation, nitriding, or induction hardening, so as to give the hub plate the necessary hardness, in particular that required to resist the engagement of the resilient members. When the windows are made in this way, in a press, plastic surface flow, a torn zone and a burr are all formed. In order to improve fatigue resistance, this necessitates the provision of radiused portions at the corners of the windows. This in turn affects the state of the cut surface.

In addition, this punching operation, despite the radiused portions, can give rise to microscopic cracking, which is detrimental to the useful life of the damper. In addition, during the cutting out operation in the press, a force is exerted on the hub plate which can give rise to permanent deformation in the latter. Alternatively or in addition, it may produce some conicity of the cut edges of the window.

In any event, the use of a punching operation to form the windows has its limitations, and cannot be used on very thick hub plates. Finally, for each new cuttingout operation, tooling investment is substantial, and it is not possible to cut out components which have previously been treated so that they have a hardness above a certain value.

DISCUSSION OF THE INVENTION

Objects of the present invention are to mitigate these drawbacks, by providing in a simple and inexpensive manner a novel hub plate in which the state of the cut surfaces of the slots (such as windows) is improved, the useful life of the component is increased, and the geometry of the component is improved, as well as producing other advantages.

In accordance with the invention, a torsion damper of the type described above under "Field of the Invention" is characterised in that the slots in the hub plate are obtained by cutting out the hub plate using a laser beam.

In a damper according to the invention, the laser beam has a heating effect which provides a degree of hardening that has the advantage of making it no longer essential to carry out the additional treatment discussed above. However it is still possible, if desired, to carry out a surface treatment afterwards so as to harden the metal to a greater depth than that obtained by the laser treatment.

It will be noted that the cut which is obtained is very fine, i.e. very precise, because the laser generates a very narrow focussed beam.

In addition, the use of laser cutting avoids the use of expensive tooling, since a single laser can be suitable for the manufacture of dampers of different sizes and is very flexible in its application. The hub plate is thus made in a simple and inexpensive manner.

It will also be appreciated that the surface state of the cut surfaces is improved, particularly in mass production. In this connection the profile of the cut edge, made using a laser beam, is more regular and does not give rise to deformation of the material by plastic surface flow, nor does it cause any burr. This improvement in the surface state leads to better operation of the resilient members in use. It will also be noted that it is not necessary to form radii in the corners of the slots formed in the hub plate, and that microscopic cracking is eliminated. The useful life of the damper is therefore increased.

In addition, no significant mechanical force is exerted on the hub plate during the laser cutting operation, so that the edges of the slots are not conical. The geometry of the finished components is thus improved, which enables the seating of the resilient members to be improved and leads to good symmetry between the forces exerted.

Laser cutting also affords further advantages, especially when the slots are in the form of windows. In this connection, the hub plate may have a varying thickness in the zones in which the windows are cut out, so as to define thickened portions (generally referred to in this specification as ridges), for example in the upper and lower portions of the latter; and this applies to both faces. These ridges may be immediately adjacent to the windows, which was not possible hitherto due to the need to provide space for the die associated with the punch to bear against a sufficiently large area of the workpiece.

This enables the size of the workpiece (before the slots are cut out) to be reduced, which in turn leads to a saving of material. It also enables stiffening ridges or ribs to be provided on the hub plate in its more fragile zones, for example in the region of the windows or the passages which are provided for spacers to pass through them. Again, this applies to both faces of the hub plate. It is thus possible to provide a stiffening ridge close to the windows (and immediately adjacent to the latter in practice), which define a friction surface for frictional engagement with one of the guide rings.

It will also be appreciated that it is possible to reduce the size of the residual band of material that exists between the outer periphery of the hub plate and its window, without a supplementary operation. In this connection if the slots or windows are punched out conventionally, it is impossible to have such a band of material smaller in width than the thickness of the hub plate without carrying out a machining operation, either by turning or by milling. When laser cutting is used the band of material can be reduced in width, without any further machining, to a value smaller than the thickness of the hub plate. Thus, the resilient members can be fitted on a pitch circle having an increased diameter, and can if necessary be elongated, so that the damper is then able to transmit a greater torque and/or to perform an increased angular displacement.

Since the laser machining operation is also a surface treatment operation, it is possible to make a hub plate which includes a set of lugs or tenons of reduced height so as to limit the angular displacement between the hub plate and the guide rings. In this connection, laser machining produces some hardening of the lugs, thus reducing the incidence of components becoming embedded in each other when the lugs engage with the edges of the associated apertures formed in the guide rings.

Preferably, the hub plate is integral with the hub; and it is possible to provide thickened junction zones between the hub plate itself and the hub. These junction zones have a profile which is suitably chosen (for example with formation of transition junction zones), with thickened portions and bearing surfaces very close to the slots (windows) of the hub plate. This is made possible by the use of laser cutting for making the windows. All this enables material to be saved.

In addition, hub plates of increased thickness can be cut out, and cutting operations can be carried out in components which have previously been treated, regardless of the degree of hardness obtained. In this way, designs of components which were simply not possible using a punching operation in the press can be obtained.

Referring to the specifications of French published patent application FR 2 381 944A and U.S. Pat. Nos. 4,190,142 and 4,223,776, it can be seen that this increase in thickness avoids the need to make a hub plate in two parts, while enabling high torques to be transmitted.

Finally the damper can be balanced using fine cutting by means of the laser beam, for example on the outer periphery of the hub plate, when the system is unbalanced.

Further features and advantages of the invention will appear more clearly from the description of preferred embodiments of the invention which appears below, and which is given by way of example only and with reference to the accompanying drawings.

BRIEF DESCRIPTION OF THE DRAWINGS

FIG. 2 is a view in cross section taken on the line 2—2 in FIG. 1.

FIG. 3 is a view in axial cross section showing the hub seen in FIG. 2, but on a larger scale.

FIG. 4 is a view similar to FIG. 1, showing a second embodiment of the invention.

FIG. 5 is a view in cross section taken on the line 5—5 in FIG. 4.

FIG. 6 is a view in elevation showing part of the damper plate seen in FIG. 5, but on a larger scale.

FIG. 7 is a view in cross section showing a modified version of part of the clutch wheel seen in FIG. 5, but on a larger scale.

FIG. 8 is a scrap view in cross section showing the fastening of the damper to a flywheel.

FIG. 9 is a scrap view on a reduced scale as seen in the direction of the arrow 9 in FIG. 3.

DESCRIPTION OF PREFERRED EMBODIMENTS OF THE INVENTION

Figure 1:
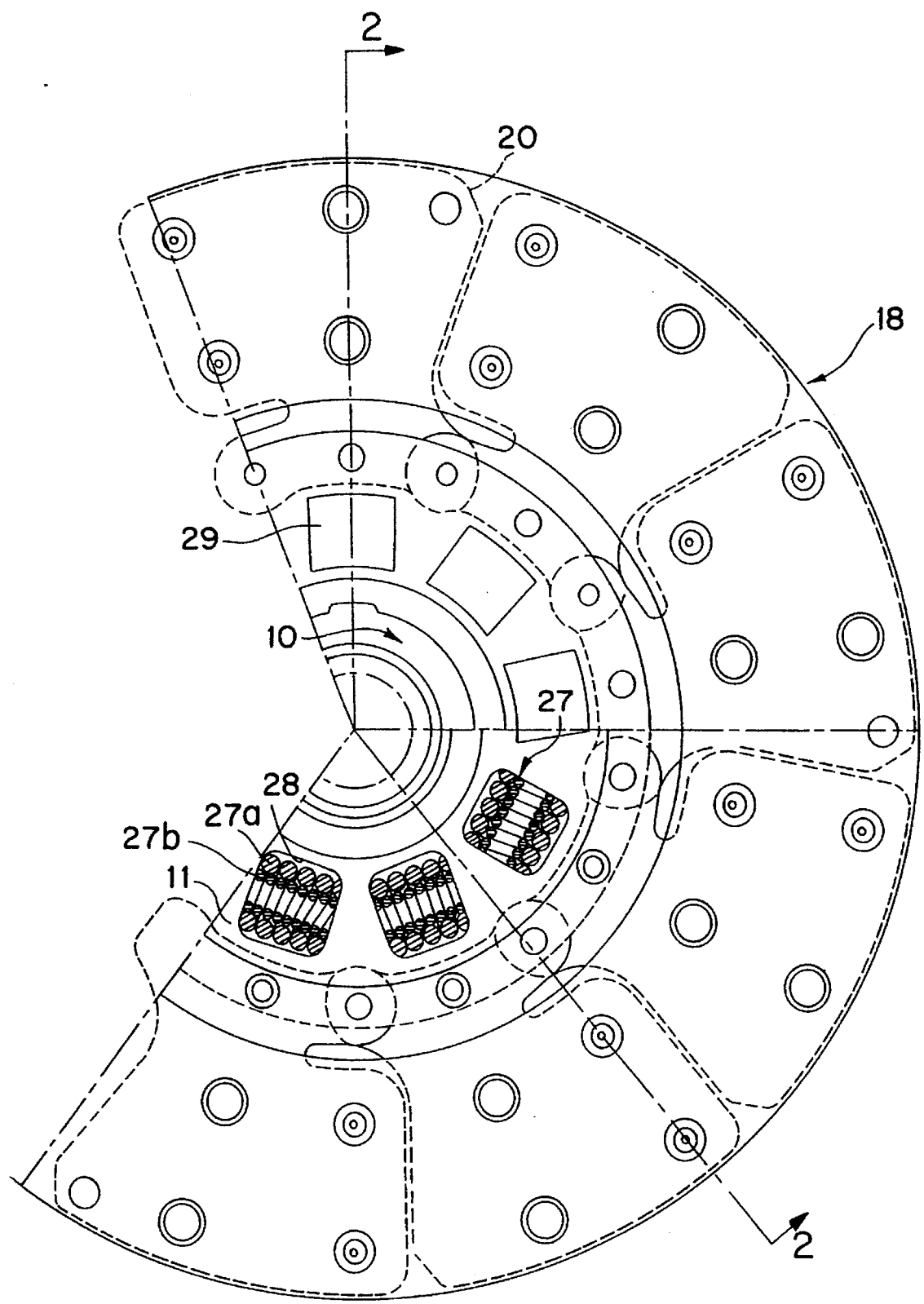
FIG. 1 is a view in elevation of part of a clutch friction wheel in accordance with the invention, shown partly broken away.

The torsion damper shown in the drawings is in the form of a clutch friction wheel which is intended for use in clutches for motor vehicles, and in particular for heavy goods vehicles or mobile industrial plant. It comprises two coaxial parts which are mounted for rotation relative to each other, within the limits of a predetermined angular displacement and against the action of circumferentially acting resilient members 27 and friction means 30, 31. In FIG. 2, the friction means 30, 31 comprises an axially acting resilient means 31 and a thrust ring 30. The first one of these coaxial parts comprises a radial plate 11 (FIGS. 1 to 3) of the kind usually referred to as a damper plate or hub plate. The hub plate 11 is formed with slots 28 in which the resilient members 27 are mounted. The other coaxial part comprises two guide rings 12 and 12' (FIGS. 1 to 3) which are arranged on either side of the hub plate. The resilient members 27 are also engaged in housings 29, which are defined on each of the two guide rings 12 and 12' in facing relationship with the slots 28 in the hub plate.

In the second embodiment shown in FIGS. 4 to 6, the hub plate is indicated by the reference numeral 111, and in FIG. 7 by the reference numeral 211. In FIGS. 4 to 7 the two guide rings are indicated at 112 and 112'. To avoid unnecessary complication of this description, the latter will be made with reference to the first embodiment shown in FIGS. 1 to 3, but it will be understood that many features of this embodiment are also to be found in the other embodiments.

The torsion damper described above is characterised in that the slots 28 in the hub plate are made by cutting out the hub plate using a laser beam which is indicated at 401 in FIG. 3.

In FIGS. 1 to 3, the clutch friction wheel comprises a hub 10 which is mounted for rotation by means of splines 5 formed in its internal bore, on the driven input shaft of the gearbox of the vehicle. The hub 10 is integral with the hub plate 11, which extends in a generally transverse or radial direction. The gearbox input shaft is not shown.

The guide rings 12 and 12' are thinner than the hub plate 11, but are of generally annular shape like the latter. The guide rings extend in a direction generally parallel to the hub plate 11. The guide rings together carry a radial friction disc or clutch plate 18, which comprises a plate member 20. In this example the plate member 20 is divided circumferentially into radial blades, which are best seen in FIG. 1. The plate member 20 is attached at its inner periphery, by means of rivets 21, to the guide ring 12, while at its outer periphery it carries conventional clutch friction pads 22 on both sides. The purpose of the friction pads 22 is of course to transmit the motion of the engine of the vehicle to the gearbox input shaft, to which end they are adapted to be gripped in the usual way between a pressure plate 200 and a reaction plate 201 of the clutch, these two plates being rotatable with the crankshaft of the engine of the vehicle. The pressure plate 200 and reaction plate 201 are indicated diagrammatically in FIG. 2.

The guide rings 12 and 12' lie on either side of the hub plate 11, and are fastened together by means of axial spacers 14, which are arranged, in this example, at the outer periphery 13 of the hub plate 11. However, in a modification which is indicated in FIG. 9, the spacers 14 pass in a known way through passages 113 formed in the outer periphery of the hub plate 11. With this modification the rivets 21 are no longer necessary, especially when the plate member 20 is of monobloc form, since the spacers 14 then also serve for securing the plate member 20 to the guide rings. All of this depends on the number of spacers 14.

In the present example the resilient members 27 are in the form of coil springs, and each of the slots 28 in which they are accommodated is of closed form, i.e. having an endless perimeter, being in the form of windows as can be seen in FIG. 3. More precisely, there are two concentric coil springs 27a and 27b (FIG. 1) in this example, mounted in each of these windows 28. The corresponding housings 29, formed in the guide rings 12 and 12' in facing relationship with the windows 28, are in this example of profiled form and consist of recesses made by press forming. The springs 27a and 27b are here mounted without any clearance in the windows 28 and recesses 29.

The laser beam 401 by which the windows 28 are cut out is produced by a laser which is indicated diagrammatically at 400 in FIG. 3. The windows are cut by effecting a relative displacement between the laser 400 and the hub plate 11. It is thus possible to move either the hub plate 11 or the laser 400, but preferably it is the laser which is moved, creating a focussed beam 401 of small diameter so as to define the edges of the window 28. This cutting along the perimeter of the window 28 produces a slug of metal which falls out at the end of the laser cutting operation. However, the use of the laser beam 401 to cut out the windows 28 produces an excellent surface condition along the edges of the windows, which leads to very good seating of the springs 27a and 27b, and hence to highly satisfactory operation of the clutch friction wheel. This effect is enhanced because the edges of the windows are hardened, since the heating effect of the laser beam sets up a kind of tempering effect during the cutting operation, and this has the advantage of replacing the additional hardening treatment which was formerly employed.

The passages 113 (FIG. 9) are also formed by cutting using the laser beam, and are thus mechanically stronger. There is thus a reduction in the likelihood of any seizing effects due to contact of the spacers 14 with the edges of the passages 113 that limit the angular displacement between the two coaxial parts of the torsion damper.

It will be appreciated here that the hub plate 11 is quite thick, and may be of greater thickness than the hub plates of the prior art which were made by press forming.

The annular hub plate 11 is of varying thickness; in particular, an annular friction ridge I is able to be provided on at least one of the faces of the hub plate. As shown in FIG. 2 this ridge 1 is provided on only one of the faces of the latter. It is very close to the outer periphery of the windows 28, being in fact immediately adjacent to them, this being made possible by the use of the laser beam for cutting out the windows. The friction ridge 1 has a radial friction surface 2 whereby the hub plate 11 bears axially against the adjacent guide ring 12 or 12' (or both guide rings if there are two friction ridges 1). More precisely, the friction ridge 1 extends in this example along the outer periphery of the hub plate 11, so that the mechanical strength of the band of material lying between the windows 28 and the outer periphery of the hub plate 11 is increased. This enables springs 27 capable of exerting a larger force than before to be fitted in the windows. Thus the ridge 2 has not only a friction surface function but also a strengthening function.

It is of course also possible (as shown in the lower part of FIG. 3) to provide a thinner, but otherwise similar, strengthening ridge on the upper face of the hub plate 11. In this example the friction surface 2 is arranged to cooperate with the guide ring 12' (FIG. 1), and is biassed into contact with the latter by the axially acting resilient means 30, 31 which bears on the other guide ring 12 and also on a radial, annular engagement surface 3, FIG. 3. This surface 3 is fixed with respect to the hub plate 11. In the present example, the axially acting resilient means comprises an elastic ring 31 in the form of a corrugated ring or (in a modification) a Belleville ring, which bears on the guide ring 12 so as to exert an axial force on a thrust ring 30. The thrust ring 30 has local, axially extending lugs which penetrate into apertures 32 formed in the guide ring 12, thereby coupling the ring 30 with the latter for rotation together.

The friction means 30, 31 and the friction surface 2 are thus arranged on either side of the hub plate 11, defining a clearance between the latter and the guide ring 12. The friction means 30, 31 is located at the inner periphery of the windows 28, and acts on the engagement surface 3. As can be seen in FIG. 3, the latter is formed on a thickened portion at the root of the hub plate 11, i.e. on the appropriate face of the thickened junction zone 4 between the hub plate 11 and the hub 10 itself.

This friction surface 3 is machined in a turning operation and is formed on the outer periphery of the junction zone 4, which in this example is asymmetrical. The surface 3 is very close, and in this case immediately adjacent, to the inner periphery of the windows 28. It will be appreciated that, here again, it is because the windows are cut out using a laser beam that this is made possible. In this connection, in conventional practice it would have been necessary to provide the friction surface 3 closer to the axis of the assembly, so as to leave room for the press forming die used in forming the windows, and to ensure that the latter are punched out satisfactorily.

During torque transmission, the torque passes through the friction pads 22 so that the springs 27a and 27b are compressed, with frictional engagement of the friction surface 2 on the guide ring 12' and frictional engagement of the elastic ring 31 on the friction surface 3. Rotational displacement is limited by adjacent turns of the springs 27a and 27b in FIGS. 3 and 9 coming into interlocking engagement, or by cooperation of the spacers with the lateral edges of the passages 113 (FIG. 9).

The shape of the junction zone 4, with its curved profiles, will be appreciated. In this connection, the root zone of the hub plate 11, where it joins the actual hub 10, can be designed so as to have the required mechanical strength, while at the same time using a minimal amount of material. It will also be appreciated that the location of the friction surface 2, which like the surface 3 mentioned above is made by turning, enables metal-to-metal frictional contact to be obtained, and hence a very high frictional torque. Use of the laser also enables driving lugs to be easily made by cutting. Thus, and referring to FIGS. 4 to 6 (in which those elements identical to those in FIGS. 1 to 3 carry the same reference numerals), the hub plate 111 is provided with a set of lugs 24 on its outer periphery. In this example, the radial height of these lugs is smaller than in the case of the prior art.

Still referring to FIGS. 4 to 6, the guide rings 112 and 112' are arranged on either side of the hub plate 111, being spaced away from the latter. The guide ring 112 is fixed at its outer periphery to a crown 114, which extends axially and radially beyond the hub plate 111; while the guide ring 112' has at its outer periphery, spaced apart at intervals, a set of radial tenons 15 (FIG. 4), by means of which it is engaged and held in slots 16 which are provided for this purpose in the crown 114 along the free edge 17 of the latter. In this example, the crown 114 is integral with the guide ring 112 and is made from a suitably press-formed blank. It carries the friction disc 18 by means of the rivets 21. All of the resilient members are in this example mounted without any clearance in the recesses 29 in the guide rings, and with or without clearance in the windows 28, so that the latter can act in a stepwise manner.

The radial lugs 24, spaced apart at intervals on the outer periphery of the hub plate 111, are engaged with a clearance in a corresponding set of apertures 25 which are provided for this purpose in the crown 114, so as to limit the possible angular displacement between the hub plate 111 and the guide rings 112 and 112'. In the present example, the lugs 24 are staggered circumferentially with respect to the windows 28. In the course of the relative angular displacement between the two coaxial parts of the torsion damper, the springs 27 are compressed in stages, and the lugs 24 cooperate with the profile of the apertures 25 so as to limit the angular displacement between the two coaxial parts.

It will be appreciated that the fine laser cutting of the lugs 24 enables the latter to be surface hardened so that the crown 114 runs no risk of seizing together with the lugs 24.

Since the windows 28 are cut out using a laser beam, it is of course possible to increase, by contrast with the prior art, the thickness of the hub plate 111, and thus to increase the thickness of the lugs 24, thus giving the latter additional mechanical strength.

In the present example the hub plate 111 is generally in the form of a flat plate, and a friction ring 101 is inserted axially between the guide ring 112' and the hub plate 111, as can be seen in FIG. 5. However, as is shown in FIG. 7, it is of course possible to replace the friction ring 101 with an integral annular friction ridge 100 extending radially outwards with respect to the springs 27, close to the outer periphery of the windows 28 as before. This reduces the number of components.

With reference to FIG. 7 it can be seen that the free edge 17 is offset radially, and that the slot 25 has an inclined portion. The increase in thickness of the lug 24 thus improves the engagement of the latter with the curved contours of the slot 25; while the damper plate, 211, can be slipped over the free edge 17 during assembly.

As will be apparent from the present description and the drawings, besides enabling a hub plate having a varying thickness in the immediate vicinity of the slots in the hub plate to be obtained, the fine laser beam cutting operation also enables the thickness of the band of material which is present between the outer periphery of the hub plate and the slots to be reduced. In addition, as is indicated in FIG. 6 in broken lines, the windows may be offset radially outwards, with the residual band of material being indicated in FIG. 6 by the reference numeral 50. This enables an increased torque to be transmitted.

The use of the laser beam can be seen, from the foregoing, to lead to great advantages. It is a very flexible technique to use, in particular if it is desired to carry out any additional treatment on the hub plate after it has been cut out by means of the laser beam.

The present invention is of course not limited to the embodiments described above. In particular, and as disclosed in United Kingdom patent specification No. 1 235 826, the guide rings may be secured to the hub plate either by riveting or by crimping, while the hub plate may be mounted for rotation with respect to the hub, and may carry the friction disc.

Referring now to FIG. 8, the hub plate, here indicated at 311, is extended radially and may be secured by means of screws 320 to a driving or driven flywheel 300, the hub being driven or driving respectively. Similarly, in FIG. 2 the guide ring 12 may be screwed on to the flywheel 201.

In the manner taught in French patent specification No. FR 2 256 686, the hub plate may be crimped on to the hub. More precisely, the hub plate has a knurled central opening, defining teeth which are harder than the hub. These teeth form a set of corresponding grooves on the hub, which locate the hub plate circumferentially with respect to the hub. The hub plate is prevented from moving axially on the hub by means of two abutments. One of these abutments comprises bosses formed on the hub by plastic flow of the material displaced by the knurled surface of the hub plate during the fitting of the latter into the hub. The other abutment is formed by crimping the hub.

As in French patent specification FR 2 570 147A and U.S. Pat. No. 4,688,666, loose coupling means may be provided between the hub plate, which is for example in the shape of an L, with the hub, in the form of a sleeve, being assembled with the hub beforehand and arranged between the hub plate and one of the guide rings.

The slots may be open on the outer periphery of the hub plate. The housings formed in the guide rings may consist of windows as indicated at 129 in FIG. 8, and a single spring (127 in FIG. 8) may be mounted in each housing 29 or 129. These springs may, instead of being in the form of coil springs, consist at least partly of blocks of elastomeric material.

In FIGS. 4 to 6, the guide ring 112' may be secured to the crown 114 by some other means, for example by welding, this guide ring 112' being secured to the crown 114, which acts as a spacer between the two guide rings.

As indicated in broken lines in FIG. 3, the hub plate may be provided with a stiffening rib or ridge in the immediate vicinity of the slots 28 and on the opposite side from the friction surface 3, while the passages 113 may be closed.

Finally, the friction means may be arranged to act radially. In this connection, when the guide rings are fixed to the hub, and the hub plate is mounted for movement with respect to the hub, it is possible to cause the friction means to act radially between the inner periphery of the hub plate and the outer periphery of the hub, due to the fact that the hub plate, having its slots formed by means of a laser beam, is able to be given a greater thickness. The friction means may consist for example of a layer of resilient material interposed between two metal rings, one of which is of divided form. This layer is fixed to the two rings, for example adhesively, with one of these rings being for example mounted on the hub for both rotation and axial movement with the latter.

What is claimed is:

1. A torsion damper comprising:

a first rotatable part comprising a hub plate defining a plurality of slots;

a second rotatable part comprising a pair of guide rings positioned on either side of the hub plate, wherein each said guide ring is formed with housing portions facing toward said slots in the hub plate, said housing portions defining a housing area;

mounting means for mounting said first and second rotatable parts coaxially with each other, said first and second rotatable parts being mounted for relative rotation of a predetermined angular displacement:

a plurality of circumferentially acting resilient members mounted between said rotatable parts for resisting said relative rotation, said resilient members being carried both in said slots and in said housing area;

friction means associated with said rotatable parts for resisting said angular displacement; and, a hub integrally formed with said hub plate to define a thickened junction zone joining said hub to said hub plate, said hub plate having on one side a friction ridge adjacent said slots, said friction ridge defining a friction surface for frictionally contacting on one of said guide rings;

wherein said slots are formed in said hub plate by a laser beam which cuts out the slots and the hub plate defines a varying thickness at an adjacent outer radial position with respect to said slots.

2. A torsion damper according to claim 1, wherein said slots are in the form of windows, said friction ridge extends radially at an outer periphery of said hub plate adjacent to said windows.

3. A torsion damper according to claim 2, wherein the hub plate defines an engagement surface, and an axially acting resilient means contacts said engagement surface and one of said guide rings to resiliently urge said friction ridge into contact with the other of said guide rings.

4. A torsion damper according to claim 3, wherein said engagement surface extends radially inside of and adjacent to said slots.

5. A torsion damper comprising:

a first rotatable part comprising a hub plate defining a plurality of slots:

a second rotatable part comprising a pair of guide rings positioned on either side of the hub plate, wherein each said guide ring is formed with housing portions facing toward said slots in the hub plate, said housing portion defining a housing area;

mounting means for mounting said first and second rotatable parts coaxially with each other, said first and second rotatable parts being mounted for relative rotation of a predetermined angular displacement;

a plurality of circumferentially acting resilient members mounted between said rotatable parts for resisting said relative rotation, said resilient members being carried both in said slots and in said housing area;

friction means associated with said rotatable parts for resisting said angular displacement; and, a crown extending axially and radially beyond the hub plate, said crown is formed with a plurality of apertures, said guide rings being affixed to said crown, said hub plate having a plurality of lugs spaced apart on an outer periphery of said hub plate, wherein each of said lugs is received in a corresponding one of said apertures so as to limit said angular displacement, and wherein said lugs are formed by cutting by means of said laser beam;

wherein said shots are formed in said hub plate by a laser beam which cuts out the slots and the hub plate defines a varying thickness at an adjacent outer radial position with respect to said slots.

6. A torsion damper comprising:

a first rotatable part comprising a hub plate defining a plurality of slots;

a second rotatable part comprising a pair of guide rings positioned on either side of the hub plate, wherein each said guide ring is formed with housing portions facing toward said slots in the hub plate, said housing portion defining a housing area;

mounting means for mounting said first and second rotatable parts coaxially with each other, said first and second rotatable parts being mounted for relative rotation of a predetermined angular displacement;

a plurality of circumferentially acting resilient members mounted between said rotatable parts for resisting said relative rotation, said resilient members being carried both in said slots and in said housing area; and, friction means associated with said rotatable parts for resisting said angular displacement;

wherein said slots are formed in said hub plate by a laser beam which cuts out the slots and the hub plate defines a varying thickness at an adjacent outer radial position with respect to said slots; and, wherein the hub plate defines a plurality of passages, a plurality of spacers pass through said passages to join said guide rings together, said passages being formed by cutting with said laser beam.

\* \* \* \* \*